May 26, 1970          V. A. PULLOS          3,513,709
                      FLUID SAMPLER
Filed Jan. 21, 1969                    2 Sheets-Sheet 1

VLASH A. PULLOS
    INVENTOR.

BY Andrew T. Pullos

VLASH A. PULLOS
INVENTOR.

BY Andrew T. Pullos

United States Patent Office 3,513,709
Patented May 26, 1970

3,513,709
FLUID SAMPLER
Vlash A. Pullos, 1441 S. Loara,
Anaheim, Calif. 95125
Filed Jan. 21, 1969, Ser. No. 792,379
Int. Cl. G01n 1/10
U.S. Cl. 73—425.4                 9 Claims

ABSTRACT OF THE DISCLOSURE

The disclosed embodiment of the present invention is a device for extracting a sample of the water from the ocean. The device is generally formed of a housing and means in an opening of the housing for controlling fluid communication between the ambient surroundings and the inside of the housing in response to ambient pressure. A portion of the housing forms a fluid reservoir for accumulating the sample of water therein. The fluid communication means includes a rupturable disc across the opening in the housing and a piston which restricts fluid communication between the external surroundings and the inside of the housing and which is exposed to ambient pressure upon rupture of the disc. The piston is mounted for movement within the housing upon the application of ambient pressure thereto to permit fluid communication between the external surroundings and the inside of the housing. In one disclosed embodiment of the present invention, a time delay is provided for applying ambient pressure to the other side of the piston, which ambient pressure produces a force on the piston to move it to the closed position thereof. A second disclosed embodiment of the present invention includes a rupturable disc in one end of the piston which is ruptured upon the application of ambient pressure thereof to move the piston to its closed position.

---

This invention relates generally to a fluid sampler and more particularly to a device which is adapted to be submerged into a body of water and which is responsive to the pressure at a predetermined depth for receiving and storing a sample of water at that depth. The device of the present invention has particular application in underwater technology by being capable of extracting a sample of water at a particular depth without contaminating that sample with water at other depths.

A need exists in underwater technology for a device which is capable of extracting water from the sea at a particular depth and returning the extracted sample with water at other depths. If a device which is presently known for extracting a sample of water is lowered from a vessel on the surface of the water, the depth of the device cannot be accurately determined. Consequently, if the device requires a command from the vessel on the surface of the water in order to extract a portion of the water, the extracted water may not be taken at the desired depth. If such a device is lowered by a line into a body of water until a predetermined amount of line has been released, the depth of the device may vary considerably depending upon various conditions. For example, a current may carry the device to a point which is far removed from a point directly below the point of entry on the surface of the water.

On the other hand, if the device which is employed to extract a sample of water is responsive to a pressure at a predetermined depth, further contamination may occur to the sample if the device is lowered to a greater depth. Since the depth of the device cannot be accurately determined from a vessel on the surface of the water, it is often necessary to have the device descend to a lower level to insure that the proper level is attained. As a result, contamination will occur if the device is not immediately closed after the water sample is extracted from the body of water.

Accordingly, it is an object of the present invention to provide a fluid sampler which opens in response to a predetermined pressure for accumulating a water sample therein.

Another object of the present invention is to provide a fluid sampler which is capable of closing and remaining closed after extracting a sample of water from the body of water.

A feature of the present invention resides in the provision of a time-delay arrangement which permits the extraction of a sample of water from the body of water and employs the ambient pressure at the particular depth for reclosing the device.

Another feature of the present invention resides in the provision of pressure responsive means for maintaining the fluid sampler closed at greater depths than the depth at which a sample has been extracted from the body of water.

These and other objects, features and advantages of the present invention will be more fully realized and understood from the following detailed description when taken in conjunction with the accompanying drawings wherein.

Like reference numerals throughout the various views of the drawings are intended to designate the same or similar structures.

Figure 1:
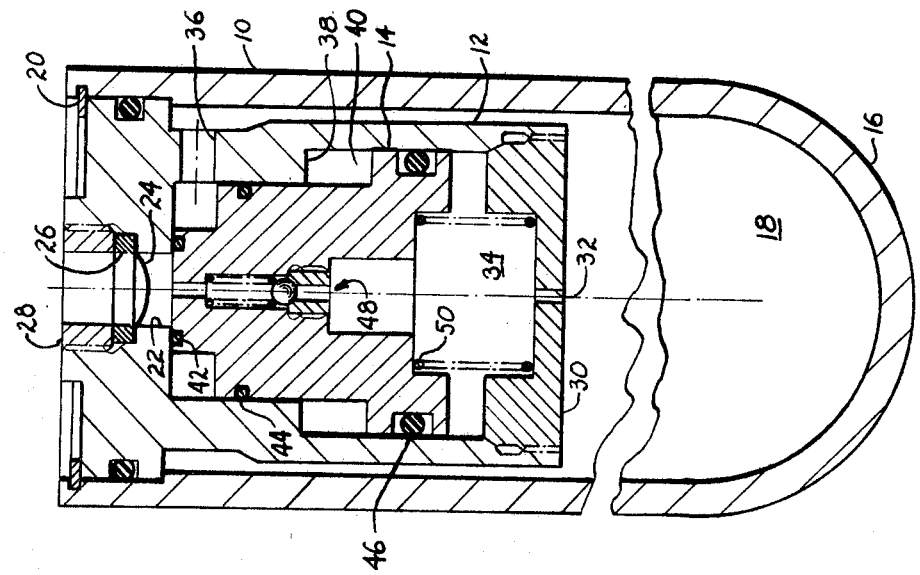
FIG. 1 is a sectional view of one preferred embodiment constructed in accordance with the principles of the present invention.

With reference to FIG. 1, there is shown one form of the present invention which is capable of descending to a predetermined level in a body of water, opening to extract from the body of water a sample of water, and reclosing to eliminate any contamination of that sample if the device is lowered to a greater depth or during ascent of the device to a higher level. The fluid sampler illustrated in FIG. 1 is formed of a reservoir or accumulator housing 10, a cage 12, and a piston 14. The housing 10 is generally cylindrical and is closed at one end which is designated with the reference numeral 16 to provide a reservoir, generally designated with the reference numeral 18. The cage 12 is mounted in the open end of the housing 10 and is retained therein by means of a ring 20. The cage 12 is provided with a central aperture 22 in one end wall thereof which is closed by means of a rupturable disc 24. The peripheral edges of the rupturable disc 24 are secured between a shoulder on the cage 12 and a hold down ring 26. A nut 28 is threadably engaged with the cage 12 to retain the hold down ring 26 in engagement with the peripheral edges of the disc 24.

An end wall 30 of the cage 12 is provided with a restricted passage 32. The passage 32 is of a size which will permit a relatively large pressure drop to be sustained thereacross for a relatively long period of time. A chamber 34 is formed between one end of the piston 14 and the end wall 30. If the pressure in the chamber 18 increases rapidly, the passage 32 provides a restriction such that the pressure in the chamber 34 increases at a much slower rate. Consequently, the passage 32 and the restriction offered thereby to the change in pressure provides a time-delay means as will be explained more fully hereinbelow. The cage 12 also includes a relatively large fluid passage 36 in a side wall thereof which is in fluid communication with the reservoir 18.

The internal surface of the cage 12 is formed of two surfaces having different diameters which form a shoulder 38 therebetween. A seal 42 is provided in one end surface of the piston 14 and is disposed for sealingly engaging the surface around the opening 22 in the end wall of the cage 12. A second seal 44 is provided between the piston and the inner surface of the cage 12 on one side of the chamber 40 and a seal 46 is provided between the piston and the inner surface of the cage on the other side of the chamber 40. A relief valve, generally designated with the reference number 48, is provided in a central aperture extending through the piston 14 which provides a fluid passage between the chamber 34 and the opening 22. The relief valve 48 is generally formed of a seat, ball and spring which permits a release of pressure over a predetermined amount from the chamber 34. A spring 50 is provided between one end of the piston 14 and the end wall 30 to bias the piston away from the end wall 30.

It will be noted that the sealing areas provided by the seals 42, 44, and 46 are unequal. The device illustrated in FIG. 1 is operative to extract a sample of water from the body of water at a predetermined depth determined by the rated burst pressure of the rupturable disc 24. If the device is lowered to the predetermined depth, the rupturable disc 24 fails and the ambient pressure at that depth is applied to the end of the piston 14 across the area defined by the seal 42. Upon failure of the rupturable disc 24, the water pressure against the end of the piston 14 creates a pressure differential across the seal 42 causing the piston 14 to be moved downwardly to permit water to enter through the passage 36 into the reservoir 18.

After the piston 14 has been moved downwardly to permit water to enter the reservoir 18 and as the water fills the reservoir 18, the pressure therein increases. Since the chamber 40 is sealed and is disposed at one atmosphere pressure, when the force across the seal 46 becomes greater than the force across the seal 44, the piston 14 will move to close and the device will again be sealed by means of the seal 42. Since the force developed on the piston 14 at each of the sealing areas is equal to the pressure multiplied by the sealing area, the piston 14 will, by means of the seal 42, not permit the entry of further water therein at lower depths in the body of water. Consequently, the water extracted during the operation of the piston 14 will not be contaminated by the entry of water therein at a lower depth. The purpose of the relief valve 48 is to release some of the pressure within the reservoir 18 and the chamber 34 as the device is raised to the surface of the body of water.

An example of the operating conditions will provide a better understanding of the capability of the device illustrated in FIG. 1. Assume that the following operating conditions exist:

(1) The burst pressure of the disc 24 is equal to 100 p.s.i.
(2) The area defined by the seal 42 is equal to 0.31 square inch.
(3) The area defined by the seal 44 is equal to 1.77 square inches.
(4) The area defined by the seal 46 is equal to 3.14 square inches.
(5) The device is assembled in ambient pressure equal to 15 p.s.i..
(6) The spring force is essentially 2 pounds for the entire movement of the piston 14.

Under such operating conditions, the disc 24 will rupture at 100 p.s.i. to permit water at that pressure to exert a downward or opening force on the piston 14. This opening force will be equal to the quantity (100 p.s.i.) (0.31 in.²), or 31 pounds. One upward or closing force will be equal to the quantity (15 p.s.i) (0.31 in.²), or 4.7 pounds and the other closing force will be equal to the spring force, or 2 pounds. The net force on the piston will be downward or an opening force equal to 24.3 pounds.

When the piston 14 has moved sufficiently to release the sealing engagement of the seal 42, the opening force is equal to the quantity (100 p.s.i.—15 p.s.i.) (1.77 in.²) — 2 lbs., or 148.45 pounds. The pressure, P, which is required to produce a force sufficient to close the piston 14 can be found from the solution of the following:

$$3.14 \ (P-15) = 148.5 \qquad (1)$$

From which:

$$P = 62 \ \text{p.s.i.} \qquad (2)$$

The pressure in the chamber 18 will increase rapidly, but because of the restricted passage 32, the pressure in the chamber 34 will increase at a considerably lesser rate. Therefore, the pressure in the chamber 18 may attain ambient pressure of 100 p.s.i. well before sufficient pressure is attained in the chamber 34 to close the piston 14. However, as determined hereinabove, when the pressure in the chamber 34 exceeds 62 p.si., the piston 14 will be forced to its original or closed position to cause the seal 42 to engage the surface surrounding the opening 22.

Once the piston 14 has reclosed, a closing or upward force is equal to the quantity (100 p.s.i.—15 p.s.i.) (3.14 in.²) +2, or 268.9 pounds; and an opening or downward force is equal to the quantity (100 p.s.i.—15 p.s.i.) (1.77 in.²) +(P—100 p.s.i.) (0.31 in.²), where P is the ambient pressure. If P is equal to 100 p.s.i. the closing force will be equal to 118.45 pounds. In order for the piston 14 to reopen, the following condition must exist:

$$(P-100) \ (0.31) + (100-15) \ (1.77) = (100-15) \\ (3.14) + 2 \qquad (3)$$

From which:

$$P = 482 \ \text{p.s.i.} \qquad (4)$$

Figure 2:
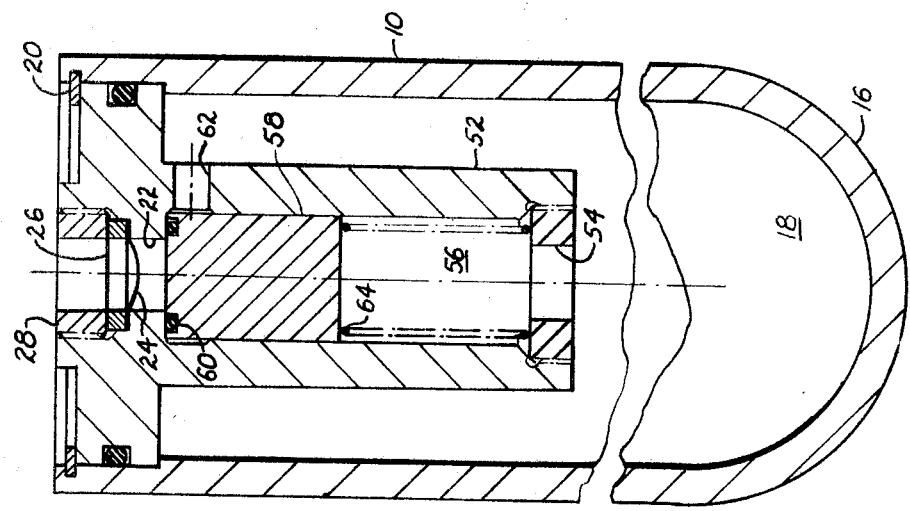
FIG. 2 is a sectional view of another embodiment of the present invention.

FIG. 2 is a view in section of another embodiment of the present invention which is of simpler construction than the device illustrated in FIG. 1, but cannot perform one of the functions thereof. As shown in FIG. 2, a cage 52 is provided within the housing 10 which includes the central opening 22 in an end wall thereof which is closed by means of the seal 24. An aperture 54 is provided in the other end wall of cage 52 which provides a fluid passage between the reservoir 18 and a chamber 56.

A piston 58 is provided in the cage 52 and is disposed for slideable movement therein. A seal 60 is provided in an end surface of the piston 58 and is disposed for providing a sealing area around the opening 22 in the end wall of the cage 52. A fluid passage 62 is provided in a side wall of the cage 52 and is disposed in fluid communication with the reservoir 18. A spring 64 is mounted between and end wall of the cage 52 and a bottom surface of the piston 58.

When the rupturable disc 24 fails, water pressure is applied to the sealing area defined by the seal 60 to move the piston 58 downwardly to permit the entry of water through the fluid passage 62 into the reservoir 18. When the pressure within the reservoir 18 attains ambient pressure at the depth at which the disc 24 fails, the piston 58 will be pressure balanced and the spring force will be exerted on the piston 58 to move it back into sealing engagement across the opening containing the disc 24. It can be readily appreciated, however, that the device illustrated in FIG. 2 will not remain closed if it is lowered to a greater depth at which the ambient pressure is higher. Although the device illustrated in FIG. 2 will extract a sample of water from the body of water at a predetermined depth, it must be returned to the surface without permitting further descent of the device.

Figure 3:
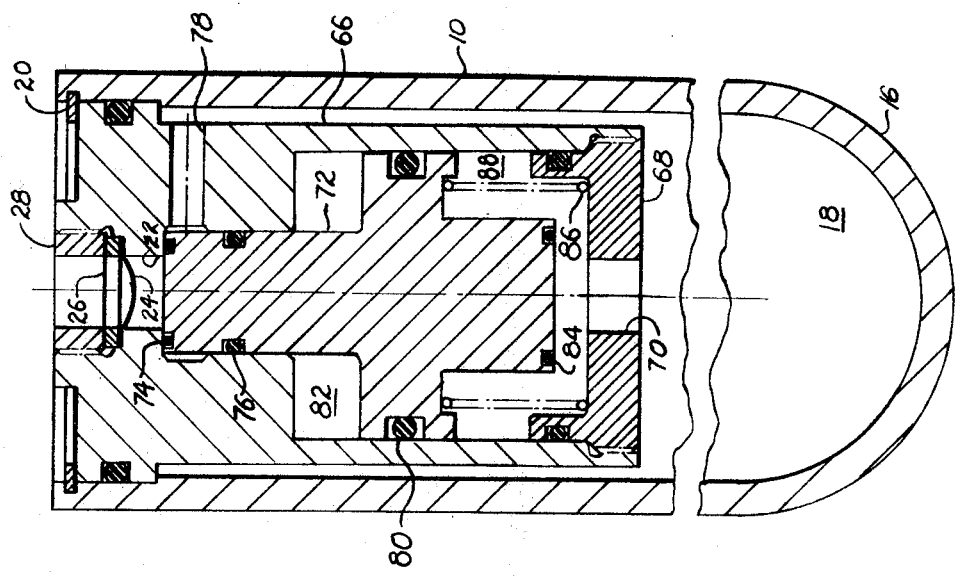
FIG. 3 is a sectional view of still another embodiment of the present invention.

The device illustrated in FIG. 3 is substantially the same as that illustrated in FIG. 1 with the exception of the lower portions of the cage and piston. As shown therein, a cage 66 is provided with an end wall 68 having a central aperture 70 in fluid communication with the reservoir 18. A piston 72 is provided with a seal 74 which extends around the opening 22. Another seal 76 is disposed between a surface on the piston 72 which is of reduced diameter and another surface of the cage 66. A fluid passage 78 is provided in the side wall of the cage 66 between the seal 74 and the seal 76. A seal 80 is provided in another surface of the piston 72 which is of greater diameter and sealingly engages another surface of the cage 66. A chamber 82 is formed between the seals 76 and 80 which is disposed at approximately one atmosphere pressure. Another seal 84 is provided in a bottom surface of the piston 72 and is disposed for sealingly engaging with the end wall 68 when the piston 72 is moved downwardly within the cage 66. A spring 86 is disposed between the end wall 68 and a shoulder on the piston 72 for biasing the piston 72 in an upwardly direction within the cage 66.

When the device illustrated in FIG. 3 is lowered to a predetermined depth at which the ambient pressure is equal to the burst pressure of the disc 24, the disc 24 fails and permits the ambient pressure to act upon the sealing area defined by the seal 74. The resulting pressure differential causes the piston 72 to move downwardly within the cage 66 permitting the passage of fluid through the opening 22 and the passage 78 into the reservoir 18. When the piston 72 is forced downwardly, the seal 84 sealingly engages with the end wall 68 to restrict the passage of fluid through the opening 70. As a result, a closed chamber 88 is formed which is disposed at one atmosphere pressure. The piston 72 will remain in this position until the pressure within the reservoir 18 attains the same pressure as that of the ambient pressure. When the pressure within the reservoir 18 is equal to ambient, the piston 72 will be pressure balanced and the spring 86 will bias the piston in an upwardly direction causing the seal 74 to sealingly engage with the end wall of the cage 66 across the opening 22. In addition, the chamber 88 will be exposed to ambient pressure resulting in a greater pressure unbalance which will result in the piston 72 remaining in an upward position until exceedingly great pressures are applied across the seal 74, which pressure can only be attained at a relatively greater depth. As a result, the device can be lowered to much greater depths after a sample of water has been extracted from the body of water without contaminating the extracted sample. If the disc 24 is rated at a burst pressure of 100 p.s.i., it will rupture at a level in the water corresponding to that pressure. Since the pressure in chambers 82 and 88 is equal to one atmosphere, the piston 72 will move upon rupture of the disc 24 to engage the seal 84 with the end wall 68 across the opening 70. When the pressure within the reservoir 18 attains ambient pressure or 100 p.s.i., the piston 72 will be pressure balanced and will be moved to a closed position by the spring 86. If the sealing area of the seal 80 is equal to 3.14 square inches, the closing force developed on the piston 72 will be equal to 314 pounds. If the sealing area of the seal 76 is equal to 0.601 square inch, a pressure of 520 p.s.i. must be developed before the piston 72 can again be opened. Consequently, the device illustrated in FIG. 3 can be submerged to a depth which is five times greater than the initial operating depth thereof. Disregarding the force of the spring 86, it can be readily appreciated that the sealing area of the seal 84 must be approximately equal to the sealing area of the seal 76 in order to pressure balance the piston 72 after it has opened and a sample of water has been collected.

Figure 4:
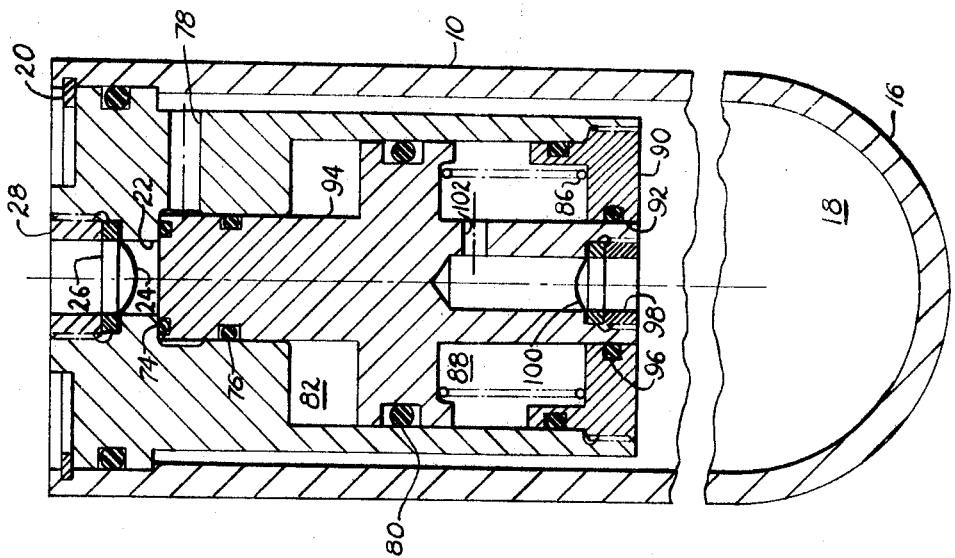
FIG. 4 is a sectional view of yet another embodiment of the present invention.

The device illustrated in FIG. 4 is substantially identical to the device illustrated in FIG. 3 with the exception of the arrangement at the lower portion of the piston 72 and the end wall 68 of the cage 66. As shown in FIG. 4, the cage 66 is provided with an end wall 90 having a central aperture 92 therein. A piston 94 is mounted within the cage 66 and is substantially identical to the piston 72 illustrated in FIG. 3. As illustrated in the drawing, the upper portions of the pistons 72 and 94 are identical. The lower portion of the piston 94 is cylindrically shaped with a diameter substantially equal to the diameter of the aperture 92. The cylindrical end portion of the piston 94 extends through the aperture 92 and a seal 96 provides sealing engagement between the respective surfaces of the piston 94 and the aperture 92.

The cylindrical end portion of the piston 94 is provided with a central aperture 98 having a rupturable disc 100 mounted therein. The aperture 98 on one side of the rupturable disc 100 is in fluid communication with the chamber 88 by means of a hole 102 extending therebetween.

Upon rupture of the disc 24, pressure is applied to one end of the piston 94 to produce a downward force thereon. Movement of the piston 94 in a downward direction permits fluid communication from the external surroundings to the reservoir 18 by means of the aperture 78. The sealing area provided by the seal 96 is smaller than the sealing area provided by the seal 76, such that an increase in the pressure in the reservoir 18 will not reclose the piston 94 over the aperture 78. However, when the pressure in the reservoir 18 attains ambient pressure, the rupturable disc 100 ruptures to permit the application of ambient pressure into the chamber 88. Upon the application of ambient pressure to the chamber 88, a closing force is produced on the piston 94 across the sealing area defined by the seal 80. Once the piston 94 has reclosed across the opening 78, the same operating conditions exist with respect thereto as exist with respect to the device illustrated in FIG. 3. That is, with the above mentioned dimensions, the device must be lowered to a depth equal to approximately five times the initial operating depth before the piston 94 will again open.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention claimed is:
1. A fluid sampler comprising:
 (a) a housing having an opening therein and forming a fluid reservoir therein,
 (b) a piston mounted for slideable movement in said housing between a first position and a second position in response to the application of ambient pressure to one end thereof, said piston being disposed for restricting fluid communication through the opening in said housing in the first position thereof and permitting fluid communication through the opening to the fluid reservoir in the second position thereof,
 (c) a first rupturable disc mounted in the opening of said housing between the one end of said piston and the external surroundings, and
 (d) means connecting the fluid reservoir to the other end of said piston to permit the application of the pressure in the reservoir thereto.

2. A fluid sampler as defined in claim 1, wherein said connecting means includes time delay means for delaying the application of the pressure in the fluid reservoir to the other end of said piston.

3. A fluid sampler as defined in claim 1, wherein said housing is cylindrically shaped and includes a pair of internal surfaces of different diameters, said piston being cylindrically shaped and including a pair of surfaces having corresponding diameters to the diameters of the internal surfaces of said housing, a first seal disposed between one internal surface of said housing and one of the surfaces of said piston having a corresponding diameter, and a second seal disposed between the other internal surface of said housing and the other of said surfaces of said piston of corresponding diameter.

4. A fluid sampler as defined in claim 3, further including a third seal disposed between the one end of said piston and a surface surrounding the opening in said housing, said third seal defining a sealing area of smaller dimensions than the sealing area defined by one of said first and second seals.

5. A fluid sampler as defined in claim 3, wherein said connecting means includes an aperture, a third seal disposed between the other end of said piston in the second position thereof and a surface surounding the aperture of said connecting means.

6. A fluid sampler as defined in claim 5, further including a fourth seal disposed between the one end of said piston and a surface surrounding the opening in said housing, said fourth seal defining a sealing area of smaller dimensions than the sealing area defined by one of said first and second seals, said third seal defining a sealing area which is substantially equal to the sealing area defined by said fourth seal.

7. A fluid sampler as defined in claim 3, wherein the internal surfaces of said housing and the corresponding surfaces of said piston are formed to provide a closed chamber between said first seal and said second seal.

8. A fluid sampler as defined in claim 3, wherein said connecting means includes an aperture, said piston including a cylindrical portion extending through the aperture of said connecting means, a third seal disposed between a surface of said cylindrical portion and a surface of the aperture of said connecting means, said cylindrical portion including a central aperture therethrough providing fluid communication between said reservoir and the sealing area defined by one of said first and second seals, said connecting means including a second rupturable disc in the central aperture of said cylindrical portion.

9. A fluid sampler, comprising:
  (a) a fluid accumulator housing,
  (b) a cylindrical cage mounted in said housing and having a pair of end walls each having an aperture therein,
  (c) a rupturable disc mounted across the aperture in one of said end walls, the aperture in the other of said end walls defining a restricted passage to fluid passing therethrough,
  (d) a piston mounted in said cage,
  (e) means defining a first sealing area between one end of said piston and said one end wall, and
  (f) means defining second and third sealing areas between said piston and an inner surface of said cage, said cage and said piston being shaped to provide a first chamber between said second and said third sealing areas, said cage having an aperture through a wall thereof located between said first and said second sealing areas.

References Cited

UNITED STATES PATENTS

| | | | |
|---|---|---|---|
| 3,095,930 | 7/1963 | Kisling | 73—425.4 XR |
| 3,355,939 | 12/1967 | Van Gils | 73—152 |
| 3,367,191 | 2/1968 | Richard | 73—425.6 |

S. CLEMENT SWISHER, Primary Examiner

H. C. POST III, Assistant Examiner

U.S. Cl. X.R.

73—170